Feb. 25, 1936.    W. N. HALLANGER    2,031,648

WICK FEED OILER

Filed Jan. 18, 1932

INVENTOR
William N. Hallanger

BY
Whittemore Hulbert Whittemore & Belknap
ATTORNEYS

Patented Feb. 25, 1936

2,031,648

UNITED STATES PATENT OFFICE 2,031,648

WICK FEED OILER

William N. Hallanger, St. Clair Shores, Mich.

Application January 18, 1932, Serial No. 587,423

7 Claims. (Cl. 184—64)

This invention relates generally to the art of lubrication and refers more particularly to wick feed oilers, capable of being attached to the parts to be lubricated.

One of the essential objects of the invention is to provide an oiler of this type that may be attached to the parts to be lubricated by unskilled workmen without having to resort to special tools or wrenches.

Another object is to provide an oiler that will function efficiently regardless of the position in which it is attached.

A further object is to provide an oiler wherein the means of attachment includes a part that is removably secured within a cup-shaped portion of the oiler casing and is at all times accessible from the outside of said casing.

A further object is to provide an oiler wherein the cup-shaped portion of the casing is adapted to receive air from and serves as a support for suitable air vents within the oiler casing.

A further object is to provide an oiler wherein the vents just mentioned are constructed and arranged in such a way that air is permitted to escape from the oiler casing regardless of the position in which it is in while being filled with lubricant.

Other objects, advantages and novel details of construction of this invention will be made more apparent as this description proceeds, especially when considered in connection with the accompanying drawing, wherein.

Figure 1:
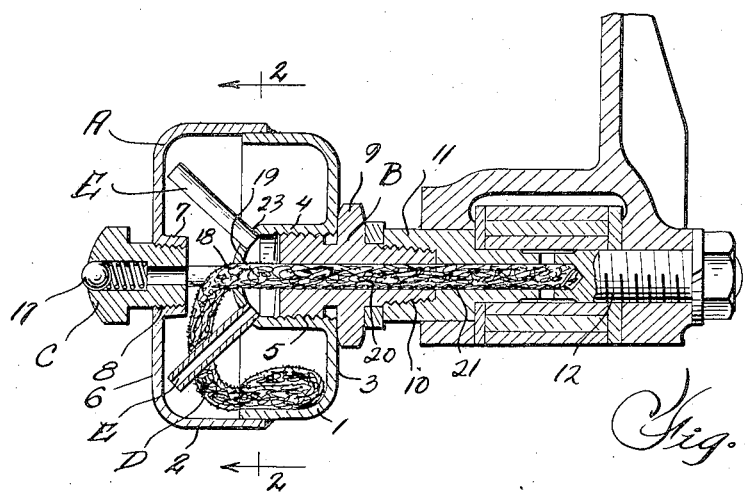
Figure 1 is a vertical sectional view showing the method of attaching the device to the head of a spring shackle bolt.
Figures 2, 3, 4:
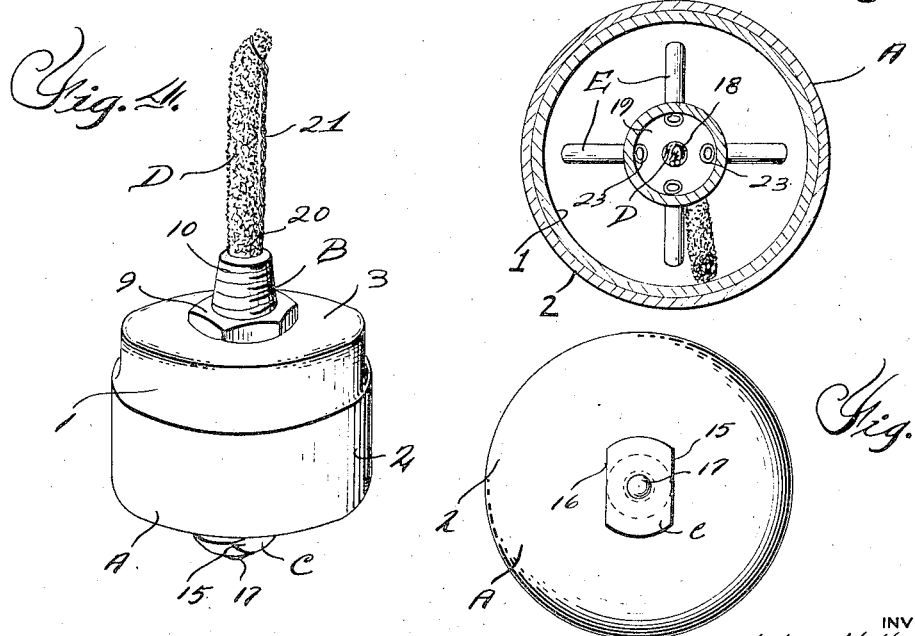
Figure 2 is a vertical section taken on the line 2—2 of Figure 1.
Figure 3 is an end elevation of the device.
Figure 4 is a perspective view of the same.

Referring now to the drawing, A is a casing; B is an attaching stud; C is a fitting through which lubricant may be fed to the casing; D is a wick for conducting the lubricant by capillary attraction from the casing A to the part to be lubricated, and E are the air vents of an oiler embodying my invention. As shown, the casing A comprises two pressed metal sections 1 and 2 respectively of cupped formation that open toward each other and have their side walls arranged in telescoping relation and rigidly secured together. The base 3 of the section 1 is provided at approximately the center thereof with an inwardly extending outwardly opening interiorly threaded cup-shaped portion 4 that receives an exteriorly threaded portion 5 of the stud B, while the base six of the section 2 has an inwardly extending interiorly threaded tubular portion 7 that receives an exteriorly threaded portion 8 of the fitting C. Preferably the stud B has a polygonal portion 9 intermediate its ends and is provided beyond this portion 9 with another exteriorly threaded portion 10 for engagement with the part to be lubricated, such as the head 11 of a spring shackle bolt 12 of a vehicle. The fitting C has flattened sides 15 and 16 respectively adapted to be received between correspondingly flattened sides of a suitable lubricant supply means (not shown) and is provided at the center thereof with a spring pressed valve 17. The wick D is preferably made of woven felt and extends through an opening 18 in the rounded base 19 of the cup-shaped portion 4 and through a longitudinally extending passage 20 in the stud B. Preferably this wick is mounted upon a wire 21 and is of sufficient length to extend to the proper point within the part to be lubricated. The air vents E, four in number, are preferably short straight tubes that extend diagonally from the suitable threaded openings 23 in the rounded base 19 of the cup-shaped portion 4 to points adjacent the juncture of the bottom and side walls of the section 2.

In use the fitting C may be engaged with a suitable lubricant supply means (not shown) so that the casing A may be filled with lubricant. As this lubricant enters the casing A from the fitting C the air within the casing escapes through the vents E into the cup-shaped portion 4 and outwardly through the passage 20 in the stud. The exteriorly threaded portion 10 of the stud may be attached to the part 11 to be lubricated and in making the connection the wick D is guided by the wire 21 to the proper point in said part for lubricating purposes. Any suitable tool (not shown) may be engaged with the polygonal portion 9 of the stud to effect the attachment. In this connection it will be noted that the polygonal portion 9 is outside the casing A and is always accessible. Due to the construction of the stud B, cup-shaped portion 4 and vents E the oiler may be attached and will function efficiently when the casing is installed in any desired position from a vertically upright position, the axis of passage 20 vertical, to a horizontal position, the axis of passage 20 horizontal, and the casing in any desired rotative position with respect to the axis of passage 20. It will also be noted that the stud B is attached to and may be removed from the casing A without being moved through any opening in the casing and without inserting into the casing through such an opening a tool of special design to effect such attachment or removal. Moreover, the stud B is positively secured to the casing A when in engagement with the cup-shaped portion 4 and is not dependent upon its connection with the part to be lubricated such as 11 to retain it in proper assembled position relative to the casing A.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:

1. In a wick feed oiler, a casing provided interiorly thereof with an outwardly opening substantially cup-shaped portion for the reception of air and a lubricant from within the casing, a wick for conducting the lubricant from the casing into said portion, and means converging from spaced points within the casing for conducting air to said portion, said means being so constructed and arranged that at least one vent for air will be provided when the casing is installed in any desired position from a vertically upright to a horizontal position.

2. In a wick feed oiler, a casing provided interiorly thereof with an outwardly opening substantially cup-shaped portion for the reception of air and a lubricant from within the casing, a wick for conducting the lubricant from the casing into said portion, and means permitting the escape of air from within the casing when the casing is installed in any desired position from a vertically upright to a horizontal position, including diverging tubular members projecting from said portion at the inner end thereof.

3. In a wick feed oiler, a casing having opposed walls, one of said walls having an inwardly extending outwardly opening substantially cup-shaped portion extending toward the other wall and provided with a substantially concavo-convex inner end, lubricant conducting means extending through said inner end, and diverging tubes projecting from said inner end to points adjacent said other wall and constituting air vents.

4. In an oiler, a casing providing a reservoir for lubricant, said reservoir having an outlet opening adapted to conduct lubricant from the reservoir to the object to be lubricated, a plurality of air vent tubes within said reservoir, the intake ends of said vents being spaced about the reservoir so as to vent the air therefrom regardless of the position in which the casing is installed between the limits of a vertically upright and a horizontal position, and the outlet ends of said vent tubes leading through the casing at points adjacent the reservoir outlet opening.

5. In an oiler, a casing providing a reservoir for lubricant, said reservoir having an outlet opening adapted to conduct lubricant from the reservoir to the object to be lubricated, a plurality of air vent tubes within said reservoir, the intake ends of said vents being spaced about the reservoir so as to vent the air therefrom regardless of the position in which the casing is installed between the limits of a vertically upright and a horizontal position and the outlet ends of said vents converging to a common discharge which communicates with said reservoir outlet opening so that air from the reservoir is vented through the lubricant discharge opening.

6. In an oiler, a sheet metal casing providing a reservoir for lubricant, one wall of said casing having a portion drawn inwardly from the plane of the surface thereof to form an inwardly extending outwardly opening cup-shaped portion, said portion being interiorly threaded for receiving an exteriorly threaded attaching means and a plurality of air vents supported on said portion and communicating between the interior of the cup-shaped opening and the interior of said casing.

7. In an oiler, a sheet metal casing providing a reservoir for lubricant, one wall of said casing having a portion drawn inwardly from the plane of the surface thereof to form an inwardly extending outwardly opening cup-shaped portion, said portion being interiorly threaded for receiving an exteriorly threaded attaching means and a plurality of air vent tubes each having one end supported on said portion and communicating with the cup-shaped opening and the other ends of said vents being spaced about the interior of the reservoir so as to vent the air therefrom regardless of the position in which the oiler is installed between the limits of a vertically upright and a horizontal position.

WILLIAM N. HALLANGER.